United States Patent [19]

Cronewitz et al.

[11] 4,273,590
[45] Jun. 16, 1981

[54] PROCESS FOR OBTAINING PRESSED BEET PULP WITH HIGH DRY-SUBSTANCE CONTENT

[75] Inventors: Theodor Cronewitz; Hubert Schiweck, both of Worms, Fed. Rep. of Germany

[73] Assignee: Suddeutsche Zucker-Aktiengesellschaft, Mannheim, Fed. Rep. of Germany

[21] Appl. No.: 122,259

[22] Filed: Feb. 19, 1980

[30] Foreign Application Priority Data

Feb. 20, 1979 [DE] Fed. Rep. of Germany ....... 2906528

[51] Int. Cl.³ .......................... C13D 1/08; B30B 13/00
[52] U.S. Cl. ...................................... 127/44; 100/37; 100/73; 127/43
[58] Field of Search ............................ 127/42, 43, 44

[56] References Cited

U.S. PATENT DOCUMENTS

| | | | |
|---|---|---|---|
| 2,084,229 | 6/1937 | Van Maanen | 100/37 |
| 3,195,446 | 7/1965 | French | 100/37 |
| 3,455,235 | 7/1969 | Koelsch | 100/37 |
| 3,477,873 | 11/1969 | Koelsch | 127/43 |
| 4,212,239 | 7/1980 | Fraula | 100/37 |
| 4,214,947 | 7/1980 | Berger | 100/75 X |

OTHER PUBLICATIONS

J. F. T. Oldfield et al., La Sucrerie Belge, 98, 109–116 (1979).
"Beet-Sugar Technology", R. A. McGinnis, ed., 2nd Edition, Fig. 5-21 at end of book, Beet Sugar Development Foundation, Fort Collins, 1971.
J. F. T. Oldfield et al., International Sugar Journal, 157–162 (1977).
A. Carruthers et al., Int. Sugar Jour., 63, 241–243 (1961).
R. A. McGinnis, "Beet-Sugar Technology", 2nd Edition, 592–595, Beet Sugar Development Foundation, Fort Collins, 1971.

*Primary Examiner*—Sidney Marantz
*Attorney, Agent, or Firm*—Armstrong, Nikaido, Marmelstein & Kubovcik

[57] ABSTRACT

Process for obtaining beet pulp of high dry-solids content from a sugar extraction process by mechanically pressing the pulp, mixing salts of polyvalent cations, an acid or both with the pressed pulp, further pressing the admixture and thermally drying the admixture. The salts of the polyvalent cations are preferably calcium chloride, aluminum chloride and ferric chloride and are added in an amount of from 0.5 to 10%, preferably from 1.5 to 4%, relative to the pulp dry-solids content. The liquid from the second pressing can be concentrated by evaporation and at least part can be recycled to produce the initial solution of the salts. The remainder of the concentrated liquid can be added to the pressed admixture before or after drying to further increase the dry-solids content.

18 Claims, 1 Drawing Figure

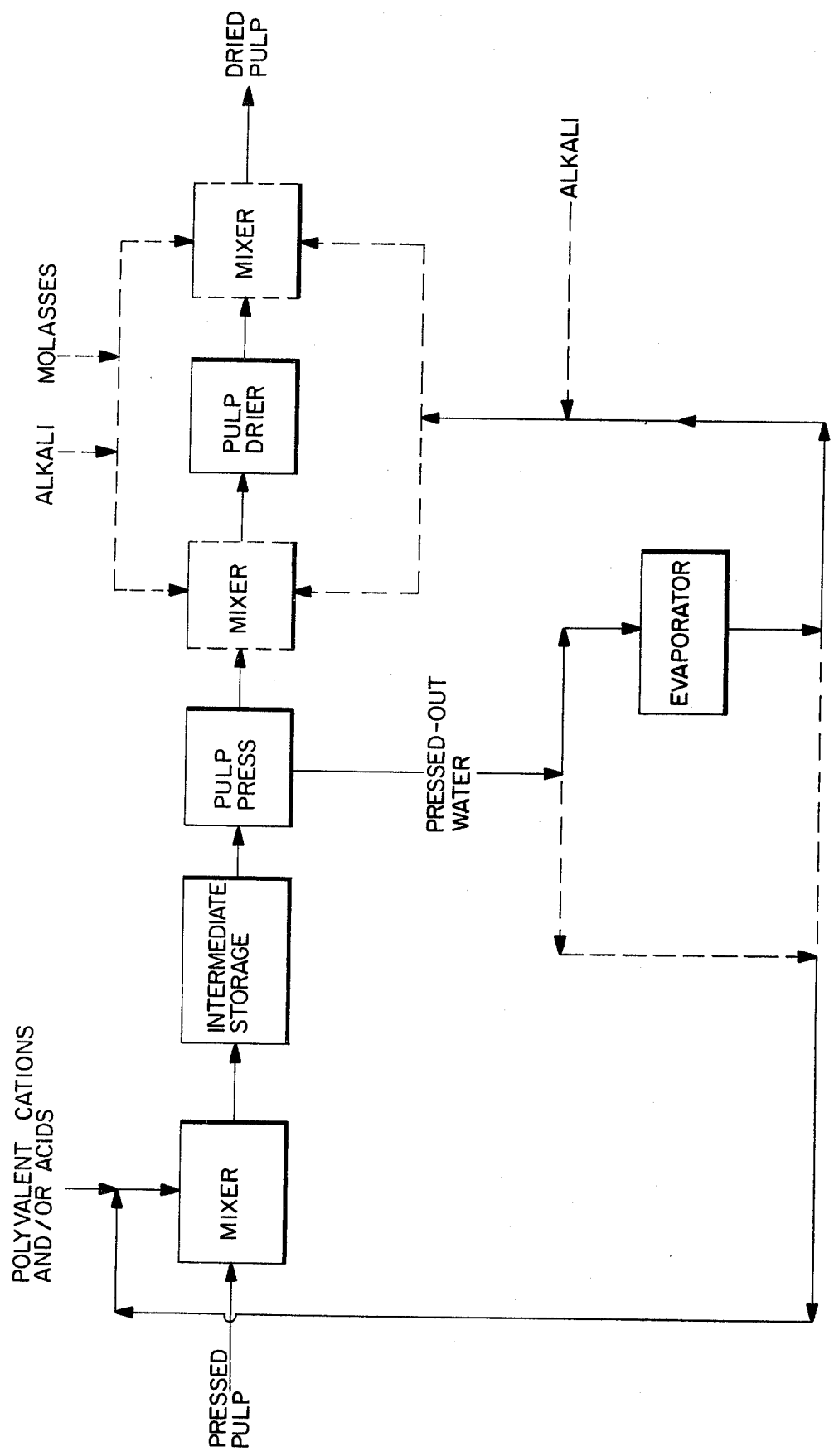

PROCESS FOR OBTAINING PRESSED BEET PULP WITH HIGH DRY-SUBSTANCE CONTENT

The invention relates to a process for obtaining pressed beet pulp with high dry-solids content and, more specifically, to a process wherein the pressed extracted cossettes collected in the making of sugar are subjected to one or more secondary pressing and thereupon are thermally dried, with the addition of particular materials prior to the secondary pressing to improve the pressing effect.

BACKGROUND OF THE INVENTION

Approximately one-third of the entire energy consumption of the sugar industry is spent in drying the pressed pulp from sugar processing. This amounts to about 2 kg of standard coal for each 100 kg of sugar beet. Pulp, as well as molasses, are by-products of sugar making and are used singly or in combination as feeds. The molasses may be added to the pulp before or after drying. The drying of the pulp to a water content of less than 12% is required for the storability and transportability of the pulp.

As a rule, wet pulp leaves the extraction plant with a dry-solids content of less than 10%, of which about 1% is sugar, and is pressed mechanically in pulp presses to a dry-solids content of about 20%. The pressed-out water thus obtained contains about 1% sugar and about 0.3% of other organic and inorganic compounds and is fed back into the extraction process to increase the sugar yield and to avoid detrimental wastes.

Independently of the design of the presses used, the efficiency of the mechanical dehydration depends on the following factors: conditions of vegetation of the beet, particle size and shape of the sugar beet cossettes, operating conditions during extraction (temperature, residence-time, pH value) and the operating conditions of the press.

Accordingly, in large-scale plants, as a rule, a dry-solids content of the pressed pulp of 18 to 23% has been achieved so far. While dry-solids contents up to 26% are possible for extreme operating conditions, for instance, low pH values in the extraction and highly decreased press output, the mechanical dehydration becomes uneconomical in comparison with thermal drying.

It is known to improve the dry matter of pressed pulp by adding salts of calcium or aluminum, by means of the diffusion-water, to the sugar extracting system (D. Becker et al, Zucker 14, 343-5, 1956, and D. Becker, Zucker 17 394-7, 1958). However, in this procedure, about 90% of the anions (chloride or sulfate) added to the diffuser together with the salts reach the raw sugar juice in the form of their alkali salts, pass through the juice purification, and thereby increase the sugar loss in the molasses. Therefore, this process is uneconomical in most cases.

To date, the industrial realization of a proposal to mix the carbonation sludge obtained in the sugar industry with the wet pulp and to increase in this manner the pressing properties of the pulp (F. Teschner, Die Nahrung 20, 817-821, 1976), has failed on account of the too-low solubility of calcium carbonate in this system and because of the impossibility of achieving the residence times required to achieve this end.

It is a further conventional practice to mix pressed pulp with molasses which enter the mixing procedure with a dry-solids content exceeding 80%. This pulp is directly fed to a thermal drying stage.

It is furthermore known to subject such a molasses-and-pulp mixture to another mechanical pressing operation and possibly to a subsequent drying procedure because the molasses with their high dry-solids content mix with the residual water in the pulp with very low dry-solids content and thereby a dry matter content in the surrounding liquid of about 10% is obtained. This modifies the osmotic relations between aqueous phase and hydratized plant fiber and, most of all, increases the liquid volume, which can again be pressed out. The resulting dry-solids content of the liquid phase is essentially dependent on the amount of added molasses. Energy conservation can be achieved in that the liquid mixture pressed out in the second pressing stage consisting of molasses and residual water can be evaporated in a single or multi-stage evaporation plant at little cost in energy or waste heat, whereby the amount of water to be evaporated in the directly heated pulp drying stage is decreased.

OBJECTS AND SUMMARY OF THE INVENTION

The object of the invention is to improve the mechanical pressing properties of wet pulp in the sugar industry by chemically acting on the cell structure substances and to decrease thereby the energy consumption in the ensuing thermal drying without diminishing the economy and the quality of sugar extraction and sugar isolation.

The present invention improves a process of the initially cited type, in that following a first mechanical pressing, salts of polyvalent cations, for instance, calcium chloride, aluminum sulfate, iron chloride, etc. and/or acids, for instance, hydrochloric acid, are mixed to the pressed pulp for the purpose of lowering the pH value and thereafter a second mechanical pressing of the pressed pulp takes place.

Energy consumption for the thermal drying process can be decreased by about 40% by the present invention. The pressed pulp following the first mechanical pressing is treated with salts of polyvalent cations, for instance, $CaCl_2 \cdot 6H_2O$, $FeCl_3 \cdot 6H_2O$; the carboxyl groups in the pectin structure still occupied by monovalent cations (potassium, sodium) are exchanged against polyvalent cations. In this manner, the pressing quality of the pressed pulp in the course of a second, ensuing mechanical pressing operation is appreciably improved. Due to the addition of the salt solution following the first pressing stage, a dry-solids content greater than 35% is achieved following the second mechanical pressing operation of the once-pressed pulp. The pressed-out water from the second pressing stage—which also contains higher-valent cations still unexchanged—can be used in part to dilute the salt solutions and to produce a mixture of the untreated pressed pulp. Only that portion of the cations has to be replaced which remains in the treated, double-pressed pulp. By using acid salts or by adding acids, for instance, hydrochloric acid, the pH value in the pulp can be lowered so that the pressing quality of the once-pressed pulp again will be improved. Such a lowering of the pH value is uneconomical during the sugar extraction process because the amounts of acid needed would be substantially higher than during the pressing operation and the added excess—as described in relation to the addition of the salts—would reach the molasses through the raw juice and thus lower the sugar yield. Lowering the pH in the sugar extraction furthermore results in undesirable process side effects, for instance, sucrose inversion.

If the lower pH value in the double-pressed pulp is not desired, a re-alkalization may be carried out by adding alkali ions or alkaline earth ions, for instance, sodium hydroxide, calcium oxide or calcium hydroxide.

The excess of the pressed liquid partly returned after addition of salt and/or acid for mixing with the pressed pulp can be concentrated in a single or multi-stage evaporation system to about 90% dry-solids content and added to the pulp after the second pressing or the drying. However, part of the pressed liquid concentrated in the evaporator may be taken back for mixing, because the dry-solids content of the pressed pulp also increases with dry-solids content of this admixed liquid. On the other hand, adequate wetting of the pulp must take place, which depends on the admixed amount of water and on the amount of water remaining in the pulp after the first pressing. When using the process of the invention, the optimal, i.e., the most economical terminating point of the (first) pressing of the wet pulp, aimed at the time at maximum dry-solids content, will shift to lower dry-substance contents because the output of the first pulp presses does increase without degrading the thermal drying. The level of pressing can then depend on the yield relation of the sugar extraction, thus improving its process efficiency.

An addition of hydroxides for adjusting the pH value, or also of other components which increase the feed value of the dried pulp, may take place following the second pressing together with the addition of molasses which is ordinarily added to the wet pulp as feed components.

BRIEF DESCRIPTION OF THE DRAWING

The two examples below will illustrate in relation to the attached FIGURE, how the process technology of the present invention is implemented.

The abbreviations and symbols used in the drawing and in Example 1 below denote the following:

| | | |
|---|---|---|
| PS | = | pressed pulp |
| DS | = | dried pulp |
| SL | = | pressed-out water |
| M | = | molasses |
| C | = | polyvalent cations or their salts |
| S | = | acids |
| CS | = | C and/or S |
| A | = | alkali hydroxides or alkali-earth hydroxides |
| Pr | = | pulp press (mechanical dehydration) |
| Mi | = | mixing equipment |
| Is | = | intermediate storage |
| Ev | = | evaporation equipment |
| Dr | = | pulp drier (thermal dehydration) |
| ⎯⎯ | = | defined path |
| ------- | = | alternative path |

DETAILED DESCRIPTION OF PREFERRED EMBODIMENTS

EXAMPLE 1

The pressed pulp PS obtained by a first mechanical pressing operation known per se and containing about 80% water are mixed as shown in the figure in mixing equipment Mi of known design (for instance, DRAIS, Mannheim; SCHUGI, Amsterdam) with an aqueous solution of salts of polyvalent cations. The dissolution of the salts takes place in the pressed water SL fed back from the subsequent second pressing stage. From 0.5 to 10%, preferably from 1.5 to 4% of the polyvalent cation salts, calculated as being water-free with respect to pulp dry-solids content, for instance, $CaCl_2 \cdot 6H_2O$, $AlCl_3 \cdot 6H_2O$ or $FeCL_3 \cdot 6H_2O$, are added. Simultaneously, an acid may be added, for instance, hydrochloric acid, in the same manner, in an amount depending on the buffering capacity of the pulp, whereby a pH value of from 2.5 to 5, preferably from 3.5 to 4.5 is achieved in the mixture. This addition of acid can also take place without adding the salts. The mixing equipment is followed by an intermediate reservoir Is absorbing the flow-rate fluctuations between first pressing station (not shown) and the second pressing station Pr. This intermediary storage Is must be so designed that a minimum residence time of 10 minutes as contact time between pulp and liquid is ensured.

The pulp achieve, after the second pressing and as a function of the applied addition of additive, water contents of 70% (with only acid addition), 65% (with only salt addition), and 60% (with both salt and acid addition). This described pressing performance depends on the operating conditions of the pulp press. It can be achieved, for instance, for the RS 64 press by STORD of Bergen, Norway for a spindle speed of 1.6 rpm, a flow rate of 1.8 tons/hr of pulp dry-substance. This corresponds to a beet processing rate in the extraction process of about 720 tons/day.

The pressed water SL at the second pressing stage is—as shown by the figure—concentrated to about 90% of dry-solids content in a partial flow. The loop excess from the evaporation system Ev used for concentration is added to the pulp after the second pressing stage in a second mixer system (Mi), upstream or downstream of the drying system Dr. The proportion of the recycled, concentrated pressed water is between 20 and 80%, preferably between 40 and 70% of the circulating amount, calculated with respect to the dry-solids content of the liquid and depends, as described, on the economically optimal level of the first pressing. The admixture of the loop excess and the addition of alkalizing additives for the purpose of adjusting the pH value of the end product as a rule can be implemented along with a conventional addition of molasses.

EXAMPLE 2

This example shows the varying pressing properties of pulp with and without additives; also the pressing performance when pressing wet pulp directly from the diffusion equipment by means of comparison tests shown in Table I.

A 650 mm long double screw press from STORD/Bergen, with a 12 cm spindle diameter is used at a double-spindle speed of 2.2 rpm. The input raw material is 100 kg (wet or pressed pulp), with testing times of 1 hour per test result.

In Experiments 1 and 2, wet pulp is pressed according to the standard pressing procedures in sugar plants.

Experiments 3-12 show the improvement in dry matter content of pressed pulp obtained by the treatment of the present invention using the amounts of salts of polyvalent cations and the influence on the pH value as indicated in the Table. In Test 3, wholly untreated pressed pulp from processing is pressed with a dry-solids content of 19.5%. As a zero test, the pressed pulp in Experiments 4 and 5 received that amount of liquid required to dissolve the salts and acids in the following Tests 6-12, but did not receive any of the salts or acids.

Whereas no substantial differences are evident—in particular with respect to the dry-solids content in the pressed pulp—an essential increase in the dry-solids content is achieved when adding the salts and acids as a function of the cations used, the amount added and the pH value.

TABLE I

| Product | Test No. | DS content in % Before second pulp | DS content in % After press | Pulp-press output kg/h of dry substance | Cation Addition Material (water mixture) | % Ref. to pulp-DS | Pressed Water pH | Pressed Water % DS | Pressed Water % Sugar | Note |
|---|---|---|---|---|---|---|---|---|---|---|
| ordinary pressing | | | | | | | | | | Wet pulp direct from extraction |
| Wet pulp | 1 | 11.5 | 27.2 | 13.6 | — | — | 5.6 | 1.2 | 1.0 | |
| | 2 | 12.2 | 26.1 | 12.7 | — | — | 5.4 | 1.0 | 0.9 | |
| Pressing pressed pulp | 3 | 19.5 | 28.6 | 15.7 | — | — | 5.8 | 2.6 | 1.2 | no addition |
| Pressing pressed pulp | 4 | 16.7 | 27.2 | 12.9 | — | — | 5.9 | 0.9 | 0.7 | only water added |
| Pressing pressed pulp | 5 | 16.8 | 27.2 | 13.5 | — | — | 6.0 | 1.2 | 0.7 | |
| Pressing pressed pulp | 6 | 16.8 | 31.7 | 14.2 | $CaCl_2$ | 1.0 | 5.4 | 1.1 | 0.6 | |
| Pressing pressed pulp | 7 | 15.4 | 31.3 | 17.5 | $CaCl_2$ | 2.5 | 5.6 | 1.6 | 0.7 | |
| Pressing pressed pulp | 8 | 17.0 | 32.1 | 14.5 | $CaCl_2$ | 1.0 | 5.2 | 1.1 | 0.6 | pH value adjusted |
| Pressing pressed pulp | 9 | 17.3 | 34.6 | 14.8 | $AlCl_3$ | 1.0 | 4.9 | 1.0 | 0.6 | |
| Pressing pressed pulp | 10 | 16.8 | 37.5 | 13.8 | $AlCl_3$ | 2.5 | 4.3 | 1.2 | 0.7 | pH value adjusted |
| Pressing pressed pulp | 11 | 17.1 | 34.2 | 15.2 | $AlCl_3$ | 1.0 | 5.5 | 1.3 | 0.7 | |
| Pressing pressed pulp | 12 | 16.5 | 40.3 | 14.9 | $AlCl_3$ | 2.5 | 4.0 | 1.4 | 0.6 | pH value adjusted |

What is claimed is:

1. Process for obtaining beet pulp of high dry-solids content from a sugar extraction process, comprising:
   mechanically pressing the pulp to produce pressed pulp;
   mixing the pressed pulp with a solution of a material selected from the group consisting of salts of polyvalent cations, acids and mixtures thereof to lower the pH;
   mechanically pressing the admixture;
   recycling at least a portion of press water from the second pressing step to form said solution; and
   thermally drying the pressed admixture.

2. Process according to claim 1 wherein polyvalent salts in an amount of from 0.5 to 10% relative to pulp dry-solids content are mixed with the pressed pulp.

3. Process according to claim 2 wherein polyvalent salts in an amount of from 1.5 to 4.0% relative to pulp dry-solids content are mixed.

4. Process according to claim 1 wherein said solution is obtained by adding the polyvalent salts in the form of aqueous solutions to press water obtained from the second pressing step.

5. Process according to claim 2 wherein said solution is obtained by adding the polyvalent salts in the form of aqueous solutions to press water obtained from the second pressing step.

6. Process according to claim 3 wherein said solution is obtained by adding the polyvalent salts in the form of aqueous solutions to press water obtained from the second pressing step.

7. Process according to claim 1 further comprising concentrating press water of the second pressing step in a single or multi-stage evaporating facility and recycling a portion of the concentrated liquid for dissolving the polyvalent salts and supplying the remainder before or after thermal drying to the pressed admixture.

8. Process according to claim 2 further comprising concentrating press water of the second pressing step in a single or multi-stage evaporating facility and recycling a portion of the concentrated liquid for dissolving the polyvalent salts and supplying the remainder before or after thermal drying to the pressed admixture.

9. Process according to claim 3 further comprising concentrating press water of the second pressing step in a single or multi-stage evaporating facility and recycling a portion of the concentrated liquid for dissolving the polyvalent salts and supplying the remainder before or after thermal drying to the pressed admixture.

10. Process according to claim 4 further comprising concentrating press water of the second pressing step in a single or multi-stage evaporating facility and recycling a portion of the concentrated liquid for dissolving the polyvalent salts and supplying the remainder before or after thermal drying to the pressed admixture.

11. Process according to claim 5 further comprising concentrating press water of the second pressing step in a single or multi-stage evaporating facility and recycling a portion of the concentrated liquid for dissolving the polyvalent salts and supplying the remainder before or after thermal drying of the pressed admixture.

12. Process according to claim 6 further comprising concentrating press water of the second pressing step in a single or multi-stage evaporating facility and recycling a portion of the concentrated liquid for dissolving the polyvalent salts and supplying the remainder before or after thermal drying to the pressed admixture.

13. Process according to any one claims 7, 8, 9, 10, 11 or 12 wherein the pH value of the pressed pulp is lowered to 2.5 to 5, preferably to 3.5 to 4.5.

14. Process according to claim 13 further comprising raising the pH value of the pressed admixture by the addition of hydroxides to a level of from 6 to 8 before or after drying.

15. Process according to claim 14 wherein the addition of hydroxides to raise the pH value is combined before or after drying with the remainder of the concentrated liquid.

16. Process according to claim 1 wherein the salt of the polyvalent cation is selected from the group consisting of calcium chloride, aluminum sulfate, aluminum chloride and ferric chloride.

17. Process according to claim 1 wherein the acid is hydrochloric acid.

18. Process according to claim 14 wherein the hydroxide is calcium hydroxide or sodium hydroxide.

* * * * *